United States Patent [19]
Laporte

[11] 3,947,058
[45] Mar. 30, 1976

[54] SEAT-BELT RESTRAINER

[76] Inventor: Jean Andre Laporte, Les Artigues de Lussac, 33570 Lussac, France

[22] Filed: July 30, 1974

[21] Appl. No.: 493,667

[52] U.S. Cl. ............................. 280/150 SB; 188/1 C
[51] Int. Cl.² ........................................... B60R 21/10
[58] Field of Search .............. 280/150 SB; 188/1 C; 296/65 A; 267/8 R; 297/386

[56] References Cited
UNITED STATES PATENTS

| | | | |
|---|---|---|---|
| 2,227,717 | 1/1941 | Jones | 296/65 A |
| 2,680,476 | 6/1954 | Saffel | 280/150 SB |
| 3,419,308 | 12/1968 | Apri | 280/150 SB |
| 3,744,814 | 7/1973 | Sturman | 280/150 SB |

*Primary Examiner*—Robert R. Song
*Attorney, Agent, or Firm*—Ernest G. Montague; Karl F. Ross; Herbert Dubno

[57] ABSTRACT

A safety-enhancing device for use in a seat-belt equipped frame of a vehicle assures a progressively increasing set belt tension in the event of a collision and a shock reduction to the user by an upward moving stem acting on a compression spring coupled to antirelease means. The device is easily restorable to an initial position by an external handle.

2 Claims, 2 Drawing Figures

SEAT-BELT RESTRAINER

FIELD OF THE INVENTION

My invention relates to a seat-belt restrainer providing increased safety and designed to minimize injury to the user.

BACKGROUND OF THE INVENTION

Conventional seat-belts provide a restraining action, but do not prevent the user from being severely jolted in the event of a collision. Means have therefore been sought to minimize such a jolt and to bring the forward movement of the user to a halt in a progressive, rather than quasi-instantaneous fashion.

OBJECTS OF THE INVENTION

It is therefore an object of my invention to obviate the aforesaid disadvantages, and in particular to provide means for a gradual decrease of the forward movement of the user consistent with providing effective restraining action.

SUMMARY OF THE INVENTION

A safety-enhancing device for use in a seat-belt equipped frame of a vehicle assures a progressively increasing seat-belt tension in the event of a collision and a shock reduction to the user by suppressing any rear-directed user rebound. The cylindrical case of the device is attached with one end to the vehicle's frame and with the other end to the seat belt. A compression spring holds a longitudinal ratchet and a cooperating pawl in place within the cylinder, the ratchet being formed on its other longitudinal side as a rack. A collision will cause the ratchet to be pulled up from the bottom of the case until the compression of the spring halts the forward movement of the user. A pinion cooperates with a rack and is rotatable by an external handle for releasing the ratchet from the grip of a pawl when it can be restored to an initial position following a collision upon release of an additional holding rod.

In a hydraulic version of the device a cylindrical stem formed with holes and an axial bore, and carrying a piston, and a second compression spring seated in the bore replace the pawl and the ratchet in a fluid-filled cylinder, a valve being disposed on top of the second compression spring up to substantially the height of the piston seated on a flange. When the stem is pulled up as a result of a collision, fluid flows past the holes and compresses the second spring, thereby causing a retardation in the upward movement of the first compression spring and halting the forward movement of the user. When the second spring is released from compression, the valve is reseated on the flange and the fluid returns slowly to its starting location until the mechanism resumes its precollision position.

BRIEF DESCRIPTION OF THE DRAWING

These and other features of my invention will be better understood with reference to the accompanying drawing, in which.

SPECIFIC DESCRIPTION

Figure 1:
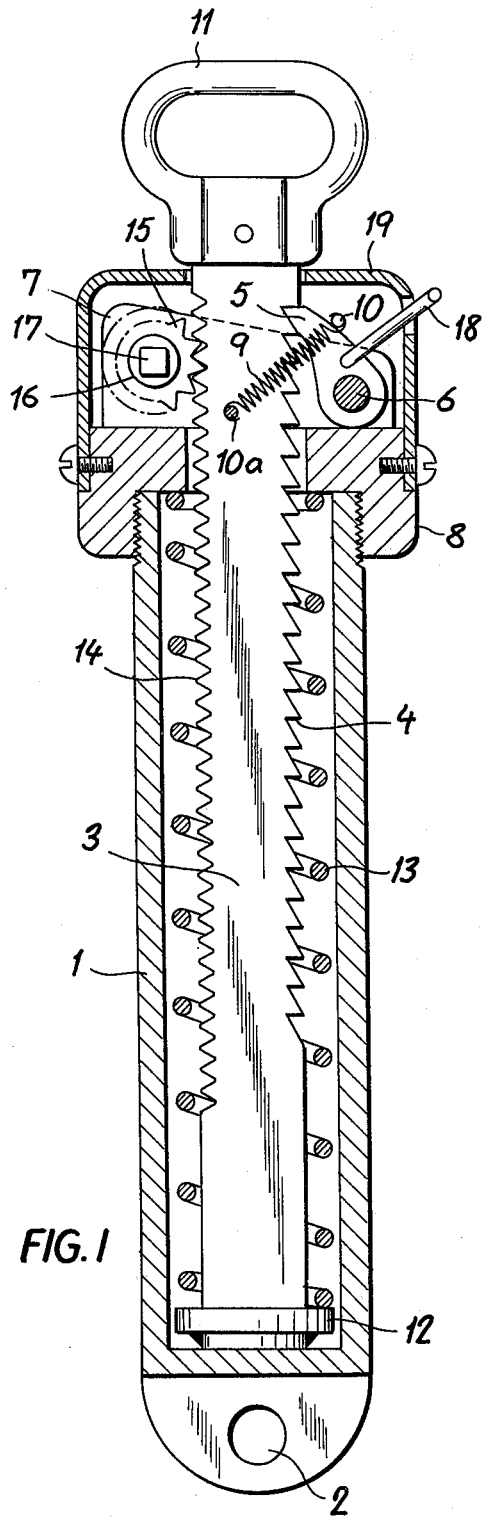
FIG. 1 shows a fragmentary elevational cross-section of a mechanical version of the seat-belt aid.
Figure 2:
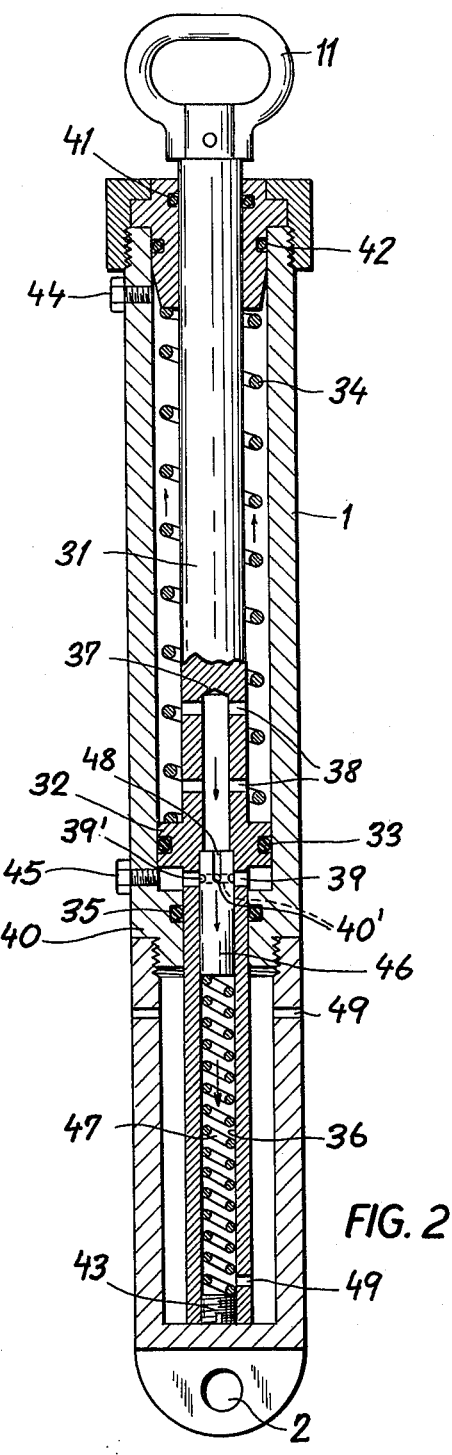
FIG. 2 shows a fragmentary elevational cross-section of a hydraulic version of the device.

FIG. 1 represents a mechanical, and FIG. 2 a hydraulic version of my invention.

Referring to FIG. 1 a cylinder 1 is shown to be formed with a hole 2 in its base for attachment to the frame of a vehicle. A stem 3, formed in its upper portion substantially as a ratchet 4, engages with a pawl 5 pivoted around an axle 6 projecting from a flange 7 which is integral with a cap 8.

Two tension springs 9, are pivoted on axles 10a attached to cap 8, joined by a rod 10 and hold pawl 5 against the teeth of ratchet 4.

An elliptical ring 11 projects from the top portion of stem 3 to be attached to one end of the seat belt.

Stem 3 terminates in a plate or ring 12 forming a seat for a compression spring 13, which in turn abuts against cap 8, so that spring 13 is compressed when stem 3 carrying ring 12 is pulled upwards during a collision.

Stem 3 is formed with a rack 14 on the side opposite from ratchet portion 4, a pinion 15 pivoted on an axle 16 and attached to flange 7 engaging the former. A rod 17 of square cross-section is fastened to the center of pinion 15 for permitting the attachment of a removable crank, not illustrated in the drawing, for repositioning of stem 3 after a collision. For this purpose also a fixed or removable rod 18 is provided to disengage pawl 5 from ratchet 4; a cover 19 encloses the mechanism.

The mechanism operates as follows:

As the seat-belt aid is attached through hole 2 to the frame of the vehicle and through ring 11 to the seat belt itself, a collision will cause stem 3 to be pulled up from the bottom of cylinder 1, pawl 5 coming to rest when the compression of spring 13 is adequate to halt the forward movement or jolt of the user without the latter being hurt.

To return the seat-belt aid to the pre-collision position, it is merely necessary to rotate the crank and lift the stem 3 slightly to relieve the pawl 5 and then to swing the pawl away from the ratchet teeth by means of rod 18 whereupon the spring 13 repositions stem 3.

Referring now to FIG. 2 it will be seen that cylinder 1, hole 2 in cylinder 1 and ring 11 remain unchanged. Stem 3 is replaced by a cylindrical stem 31 carrying a piston 32 with a seal 33. It is guided within a flange 40 of cylinder 1 holding a torroidal seal 35 when spring 34 is in compression and is formed with a stepped cylindrical bore 36 extending up to a conical surface 37 disposed above piston 32; it is also formed with openings 38 also located above piston 32 for permitting passage of fluid in the event of a collision.

Toroidal seals 41 and 42 ensure that stem 31 is tightly sealed on top, and a threaded plug 43 closes off bore 36 at the bottom. Two plugs 44 and 45 permit emptying of the hydraulic fluid and its replenishment; a valve 46 abutting a shoulder formed by stepped bore 36 is normally closed by a spring 47. Valve 46 is formed with a groove 39' opposite holes 39 drilled in stem 3 to permit passage of fluid below piston 32 in the event of a collision, and with transverse holes 40' which open into a small central hole 48 into which the fluid is released in order to restore the seat-belt restrainer's interlock after a collision.

Air vents 49 formed in cylinder 1 avoid any deformation of cylinder 1 during operation of the mechanism. The latter operates in the following fashion:

Upon a forward movement of the user in the event of a collision spring 34 is compressed, stem 31 ascends, and the fluid below piston 32 passes through holes 38, presses on valve 46 thereby compressing spring 47 and passes through holes 39 below piston 32 filling the space between piston 32 and flange 40; the user's forward movement thus comes to a gentle halt.

Under the force of spring 47, valve 46 is again seated and the fluid confined in the space between piston 32 and flange 40 passes slowly to a level above piston 32 until the mechanism resumes again its pre-collision position.

I claim:

1. A safety-enhancing device for use in a seat-belt equipped frame of a vehicle for assuring a progressively increasing seat-belt tension in the event of a collision and a shock reduction to the user by suppressing any rear-directed user rebound comprising:
    a case attached with one end to said frame and with the other end to the seat belt;
    a compression spring;
    a longitudinal ratchet and a pawl engageable with said ratchet, said pawl being maintained in engagement with said ratchet by the force of said compression spring, said ratchet being formed on its other longitudinal side as a rack; and
    a pinion cooperating with said rack and rotatable by an external handle for repositioning said ratchet to an initial position following said collision.

2. A device as defined in claim 1, further comprising a cap for enclosing at least the top of said device.

* * * * *